(12) United States Patent
Takada et al.

(10) Patent No.: US 9,664,452 B2
(45) Date of Patent: May 30, 2017

(54) HEAT EXCHANGE ELEMENT

(75) Inventors: Masaru Takada, Chiyoda-ku (JP);
Hajime Sotokawa, Chiyoda-ku (JP);
Yuichi Ishimaru, Chiyoda-ku (JP);
Takanori Imai, Chiyoda-ku (JP);
Mitsuhiko Ohira, Chiyoda-ku (JP);
Hidemoto Arai, Chiyoda-ku (JP);
Makoto Fukaya, Chiyoda-ku (JP);
Fumiaki Baba, Chiyoda-ku (JP); Koji Kise, Chiyoda-ku (JP); Shinya Tokizaki, Chiyoda-ku (JP); Yuichi Matsuo, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 477 days.

(21) Appl. No.: 14/386,614

(22) PCT Filed: Jun. 13, 2012

(86) PCT No.: PCT/JP2012/003841
§ 371 (c)(1),
(2), (4) Date: Sep. 19, 2014

(87) PCT Pub. No.: WO2013/157056
PCT Pub. Date: Oct. 24, 2013

(65) Prior Publication Data
US 2015/0053381 A1    Feb. 26, 2015

(30) Foreign Application Priority Data
Apr. 20, 2012    (WO) .................. PCT/JP2012/002736

(51) Int. Cl.
*F28F 21/06*    (2006.01)
*F28D 9/00*    (2006.01)
(Continued)

(52) U.S. Cl.
CPC ......... *F28D 9/0062* (2013.01); *F28D 9/0037* (2013.01); *F28D 21/0015* (2013.01);
(Continued)

(58) Field of Classification Search
CPC .. F28D 9/0062; F28D 9/0037; F28D 21/0015; F28F 3/048; F28F 3/06
See application file for complete search history.

(56) References Cited

U.S. PATENT DOCUMENTS 1,662,870 A * 3/1928 Stancliffe .............. F28D 9/0037
165/166
5,851,636 A * 12/1998 Lang .................... A01K 67/027
156/290
(Continued)

FOREIGN PATENT DOCUMENTS

CN    101641564 A    2/2010
EP    2 131 133 A1    12/2009
(Continued)

OTHER PUBLICATIONS

International Search Report (PCT/ISA/210) mailed on Sep. 18, 2012, by the Japanese Patent Office as the International Searching Authority for International Application No. PCT/JP2012/003841.
(Continued)

*Primary Examiner* — Devon Russell
(74) *Attorney, Agent, or Firm* — Buchanan Ingersoll & Rooney PC

(57) ABSTRACT

The present invention relates to a heat exchange element in which unit constituent members, each of which includes a partition member that has a heat-transfer property and a moisture permeability and a spacing member that holds the partition member with a predetermined spacing, are stacked and in which a primary air flow that passes along an upper surface side of the partition member and a secondary air flow
(Continued)

(D-D CROSS SECTION)

that passes along an undersurface side of the partition member and crosses the primary air flow exchange heat and moisture through the partition member, wherein a detachment suppressing rib is provided on the opposite side of the spacing member when viewed from the partition member at a bonded portion between the partition member and the spacing member, and the partition member is sandwiched by the spacing member and the detachment suppressing rib.

10 Claims, 7 Drawing Sheets

(51) Int. Cl.
F28F 3/04 (2006.01)
F28D 21/00 (2006.01)
F24F 12/00 (2006.01)

(52) U.S. Cl.
CPC ............ *F28F 3/048* (2013.01); *F28F 21/065* (2013.01); *F24F 12/006* (2013.01); *Y02B 30/563* (2013.01)

(56) References Cited

U.S. PATENT DOCUMENTS

| | | | | |
|---|---|---|---|---|
| 8,002,023 | B2* | 8/2011 | Murayama | F28D 9/0037 165/166 |
| 8,684,274 | B2* | 4/2014 | Vafai | B01J 19/0093 165/46 |
| 2003/0106680 | A1* | 6/2003 | Serpico | B01D 53/268 165/166 |
| 2003/0118887 | A1* | 6/2003 | Serpico | B01D 53/268 524/261 |
| 2005/0082045 | A1* | 4/2005 | Takada | F24F 3/147 165/133 |
| 2006/0196649 | A1* | 9/2006 | Shibata | F28D 9/0037 165/166 |
| 2008/0156469 | A1* | 7/2008 | Lee | F28D 9/0062 165/166 |
| 2009/0032232 | A1 | 2/2009 | Murayama | |
| 2009/0071638 | A1* | 3/2009 | Murayama | F24F 3/147 165/166 |
| 2009/0193974 | A1* | 8/2009 | Montie | B01D 46/0001 96/8 |
| 2011/0259572 | A1* | 10/2011 | Muratani | B29C 45/0055 165/185 |
| 2012/0073791 | A1* | 3/2012 | Dubois | B01D 53/228 165/138 |

FOREIGN PATENT DOCUMENTS

| | | |
|---|---|---|
| JP | 47-019990 | 9/1972 |
| JP | 8-110076 A | 4/1996 |
| JP | 08-110078 A | 4/1996 |
| JP | 8-145588 A | 6/1996 |
| JP | 9-152291 A | 6/1997 |
| JP | 2690272 B2 | 12/1997 |
| JP | 2003-287387 A | 10/2003 |
| JP | 2007-100997 A | 4/2007 |
| JP | 2007-285691 A | 11/2007 |
| JP | 2008-070046 A | 3/2008 |
| WO | WO 2007/119394 A1 | 10/2007 |
| WO | WO 2008/126372 A1 | 10/2008 |
| WO | WO 2013/157040 A1 | 10/2013 |

OTHER PUBLICATIONS

Written Opinion (PCT/ISA/237) mailed on Sep. 18, 2012, by the Japanese Patent Office as the International Searching Authority for International Application No. PCT/JP2012/003841.

Office Action issued on Apr. 28, 2015, by the Japanese Patent Office in corresponding Japanese Patent Application No. 2014-510973, and an English Translation of the Office Action. (6 pages).

Office Action (First Office Action) issued Dec. 16, 2015, by the State Intellectual Property Office of China in corresponding Chinese Patent Application No. 201280072450.0, and an English translation of the Office Action. (9 pages).

* cited by examiner

FIG.3
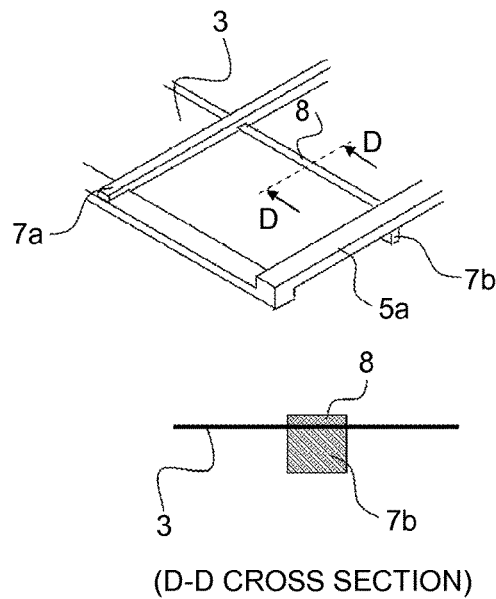
(D-D CROSS SECTION)
FIG.4
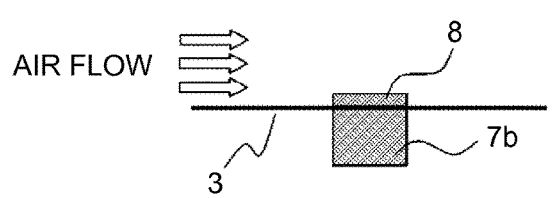
(a) SQUARE SHAPE IN CROSS SECTION
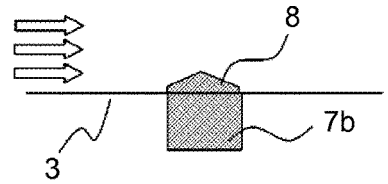
(b) INVERTED-V SHAPE IN CROSS SECTION
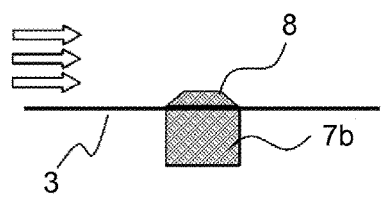
(c) TRAPEZOIDAL SHAPE IN CROSS SECTION
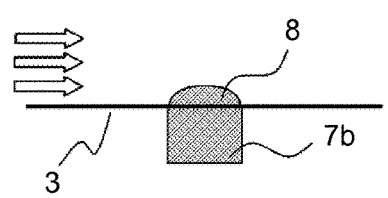
(d) ELLIPTICAL SHAPE IN CROSS SECTION (E-E CROSS SECTION)

FIG.7
E-E CROSS SECTION
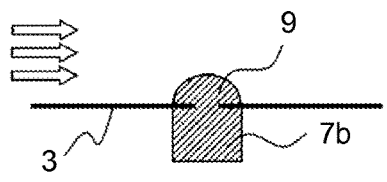
(a) ELLIPTICAL SHAPE IN CROSS SECTION
E-E CROSS SECTION
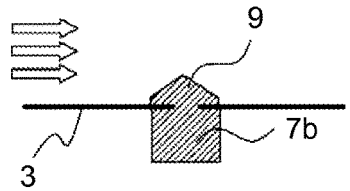
(b) INVERTED-V SHAPE IN CROSS SECTION
E-E CROSS SECTION
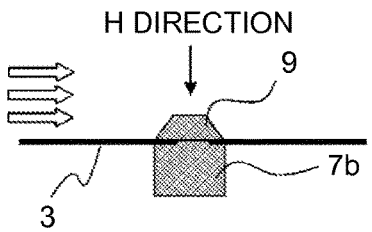
(c) TRAPEZOIDAL SHAPE IN CROSS SECTION
[SHAPE VIEWED FROM H DIRECTION IN CONICAL/ELLIPTICAL CONICAL SHAPE]
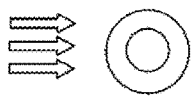
(d) CONICAL SHAPE
(e) ELLIPTICAL CONICAL SHAPE
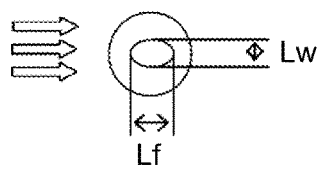
(f) COMBINATION OF CONICAL SHAPE AND ELLIPTICAL CONICAL SHAPE FIG.8
(a)
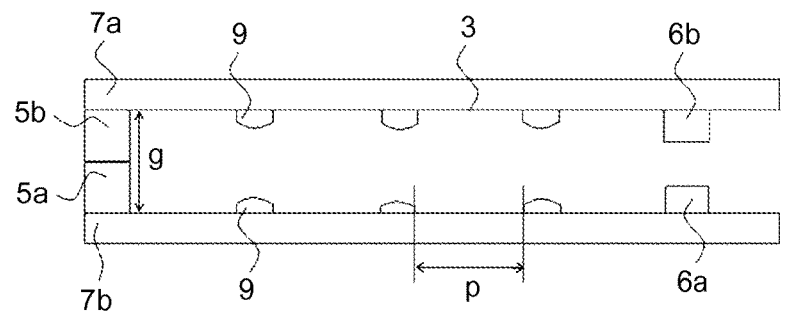
(b)
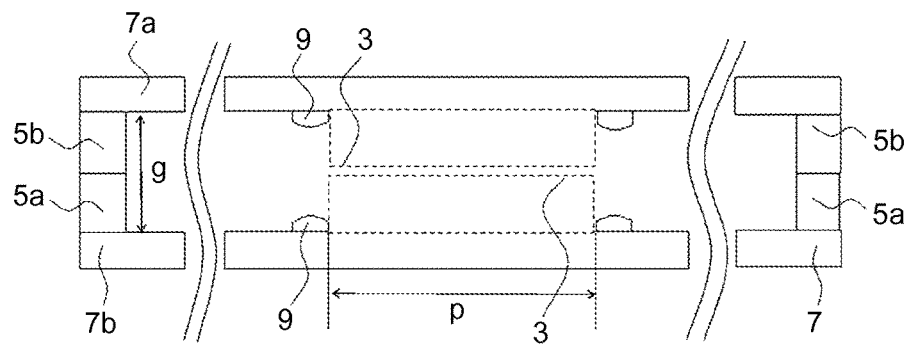
(c)
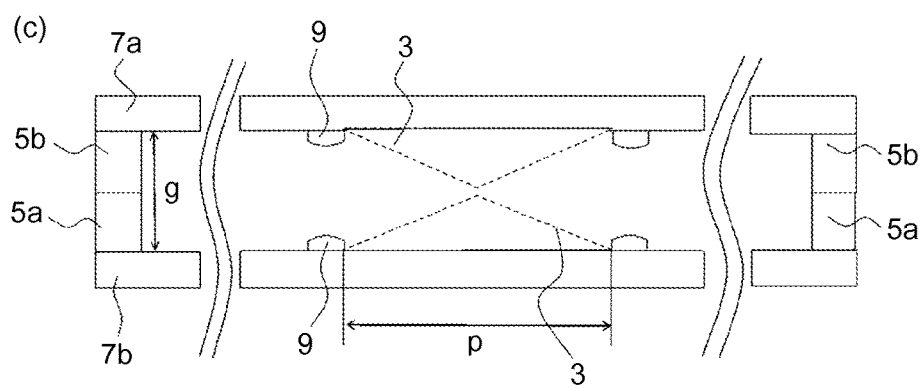

FIG.9
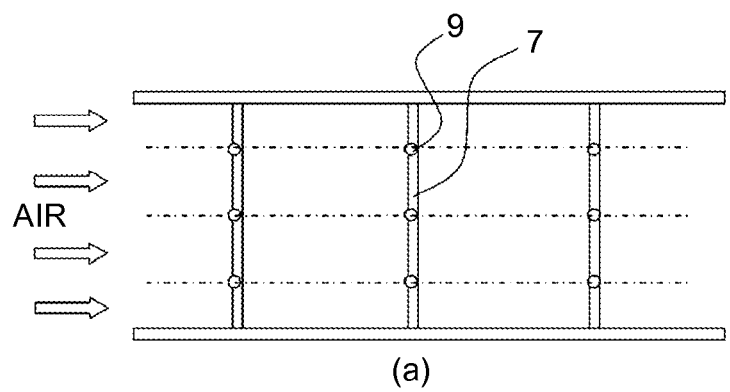
(a)
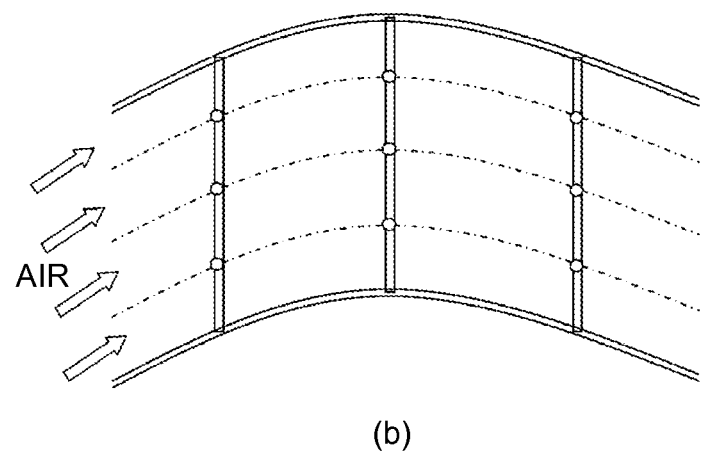
(b)

HEAT EXCHANGE ELEMENT

FIELD

The present invention relates to a heat exchange element that has a stacked structure and exchanges heat and moisture between fluids in an air conditioner that supplies air from the outdoors to indoors and discharges air from the indoors to outdoors simultaneously.

BACKGROUND

In recent years, air conditioning devices for heating, cooling, and the like have become more advanced and widespread. As the residential areas where air conditioners are used grow, the importance of a total heat exchanger for an air conditioner, which can recover the temperature and humidity during ventilation, is increasing. The total heat exchanger as described above has a heat exchange element incorporated therein as an element component that exchanges heat. This heat exchange element can exchange latent heat and sensible heat simultaneously without mixing fresh outside air drawn from the outdoors to indoors during the use of an air conditioner with contaminated air to be discharged from the indoors to outdoors. The heat exchange element is required to have high gas-sealing properties and a high total heat exchange rate. Further, in order to reduce power consumption of an air blowing device (such as a fan or a blower) that circulates an air flow for ventilation and to suppress the operating sound of the total heat exchanger to a low level, the heat exchange element is required to have a low air-flow resistance when each air flow circulates.

A conventional heat exchange element employs a structure in which partition members having gas-sealing properties, heat-transfer properties, and moisture permeability are stacked in multiple layers with a predetermined spacing, where each of the partition members is sandwiched between spacing members having a wave shape in cross section. In an example of the conventional heat exchange element, the partition member is a square flat plate, the spacing member is a wave-shaped plate formed into a triangular wave shape in cross section, and the partition members are stacked with the spacing member sandwiched therebetween in such a manner that the wave-shape direction of the alternate spacing members is turned by 90 degrees. Therefore, fluid paths in two directions, through which a primary air flow and a secondary air flow pass, are formed in every two layers (Patent Literature 1). In this heat exchange element, the spacing member is wave-shaped. Therefore, there is a problem in that the effective area of an air-flow path formed between the partition members becomes small because of the thickness of this wave-shaped plate and further the area in which the partition member and the spacing member are in contact with each other is large; therefore, the effective area of the partition member, which is capable of heat exchange, is small, thereby decreasing the total heat exchange efficiency. Furthermore, because the spacing member is formed of paper or the like, there is a problem in that the cross-sectional shape of the air-flow path can be easily deformed, thereby increasing the air-flow resistance.

Therefore, in recent years, a method has been used, in which a resin molded product is used as a spacing member of a heat exchange element instead of a wave-shaped plate, and a partition member and the resin are integrally molded. With this structure, the degree of flexibility in shape of the heat exchange element is increased, whereby the total heat exchange efficiency is improved and the air-flow resistance is reduced (Patent Literature 2).

However, the method, in which the spacing member is molded integrally with the partition member, has a problem of low adhesiveness of a bonded portion between the partition member and the spacing member. Further, because the partition member can expand and be deformed in high-humidity environment, the bonded portion is required to have an adhesive force sufficient to withstand the deformation.

In recent years, mainly, for the purpose of reducing the amount of air leakage from a total heat exchange element and improving the moisture exchange efficiency, a partition member formed with high density has been developed. This partition member has excellent properties as a partition member of the total heat exchange element, such as low breathability (air permeability) and better moisture permeability. At the same time, this partition member has a feature of a large amount of expansion/contraction, a small number of irregularities on the material surface, and a small number of cavities within the material. Therefore, when such a partition member is used, a sufficient amount of resin cannot enter the cavities within the partition member and a sufficient anchor effect is not obtained in the bonded portion. Consequently, a sufficient bonding strength cannot be obtained. Thus, when the partition member and the resin are integrally molded, they are bonded together immediately after the processing; however, the partition member repeatedly expands/contracts because of a change in temperature and humidity during use, thereby eventually causing the partition member and the spacing member to come off their bonded surface. This blocks an air-flow path and therefore increases the air-flow resistance. As a result, there is a problem of decreasing the total heat exchange efficiency.

As a method for solving this problem, a heat exchange element has been proposed, in which only a spacing member is integrally molded, and thereafter a partition member is affixed to the spacing member with an adhesive or the like (Patent Literature 3).

Another heat exchange element has been proposed, in which a cylindrical, triangular, or other-shaped convex portion is provided on a die for molding a spacing member and a partition member is held by the convex portion and embedded in the spacing member (Patent Literature 4).

CITATION LIST

Patent Literatures

Patent Literature 1: Japanese Patent Publication No. S47-19990
Patent Literature 2: Japanese Patent Application Laid-open No. 2003-287387
Patent Literature 3: Japanese Patent Application Laid-open No. 2007-100997
Patent Literature 4: Japanese Patent Application Laid-open No. 2008-70046

SUMMARY

Technical Problem

In the above heat exchange element described in Patent Literature 3, in which only the spacing member is integrally molded, and thereafter the partition member is affixed to the spacing member with an adhesive or the like, it is necessary to increase the bonded area of the spacing member and the partition member in order to enhance the adhesive strength. Accordingly, the spacing member is required to be thick; therefore, the spacing member blocks the air-flow path to a large extent, thereby increasing the air-flow resistance. As a result, there is a problem of decreasing the total heat exchange efficiency.

Further, in the above heat exchange element described in Patent Literature 4 mentioned above, in order to hold the partition member and embed it in the spacing member, the spacing member is required to have a certain thickness. Accordingly, the spacing member is required to be thick; therefore, the spacing member blocks the air-flow path to a large extent, thereby increasing the air-flow resistance. As a result, there is a problem of decreasing the total heat exchange efficiency.

The present invention has been achieved to solve the above problems and an object of the present invention is to provide a heat exchange element with a low air-flow resistance and high total heat exchange efficiency by suppressing detachment of the partition member and the spacing member from their bonded portion due to deflection of the partition member caused by a change in temperature and humidity, even when a high-density high-performance partition member is used and a spacing member has a thin rib shape.

Solution to Problem

The present invention relates to a heat exchange element in which unit constituent members, each of which includes a partition member that has a heat-transfer property and a moisture permeability and a spacing member that holds the partition member with a predetermined spacing, are stacked, and in which a primary air flow that passes along an upper surface side of the partition member and a secondary air flow that passes along an undersurface side of the partition member and crosses the primary air flow exchange heat and moisture through the partition member, wherein the spacing member includes first sealing ribs that are provided on both sides of an upper surface of the partition member and parallel to a direction of the primary air flow, second sealing ribs that are provided on both sides of an undersurface of the partition member and parallel to a direction of the secondary air flow, first spacing ribs that are connected to the second sealing ribs and are provided between the first sealing ribs and parallel to each other at a predetermined spacing, and second spacing ribs that are connected to the first sealing ribs and are provided between the second sealing ribs and parallel to each other at a predetermined spacing, and a detachment suppressing rib is provided on the opposite side of the spacing member when viewed from the partition member at a bonded portion between the partition member and the spacing member, and the partition member is sandwiched by the spacing member and the detachment suppressing rib.

Advantageous Effects of Invention

The heat exchange element according to the present invention has a structure in which a partition member is sandwiched by using resin. Therefore, even when a high-density high-performance partition member is used and a spacing member has a thin rib shape, it is possible to obtain the heat exchange element with a low air-flow resistance and high total heat exchange efficiency by suppressing detachment of the partition member and the spacing member from their bonded portion due to deflection of the partition member caused by a change in temperature and humidity.

BRIEF DESCRIPTION OF DRAWINGS

FIG. 3 is an enlarged view of part C in FIG. 2 according to the first embodiment of the present invention.

FIG. 4 is a cross-sectional view of a detachment suppressing rib according to the first embodiment of the present invention.

FIG. 7 is a cross-sectional view of the detachment suppressing rib according to the second embodiment of the present invention.

FIG. 8 is an explanatory diagram of an arrangement spacing between detachment suppressing ribs in a heat exchange element according to the second embodiment of the present invention.

FIG. 9 is a diagram showing a relationship between an air flow and the detachment suppressing ribs in the heat exchange element according to the second embodiment of the present invention.

DESCRIPTION OF EMBODIMENTS

First Embodiment

Figure 1:
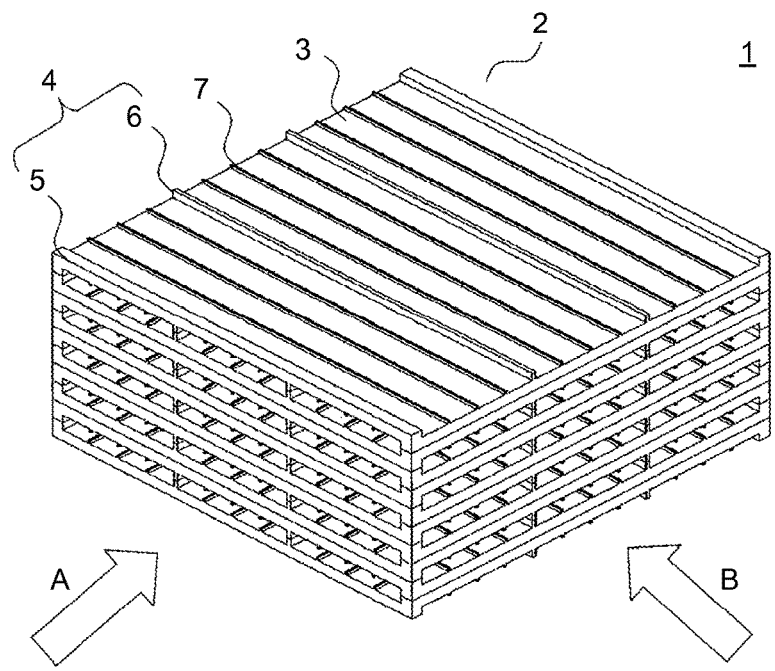
FIG. 1 is a perspective view of a heat exchange element according to a first embodiment of the present invention.
Figure 2:
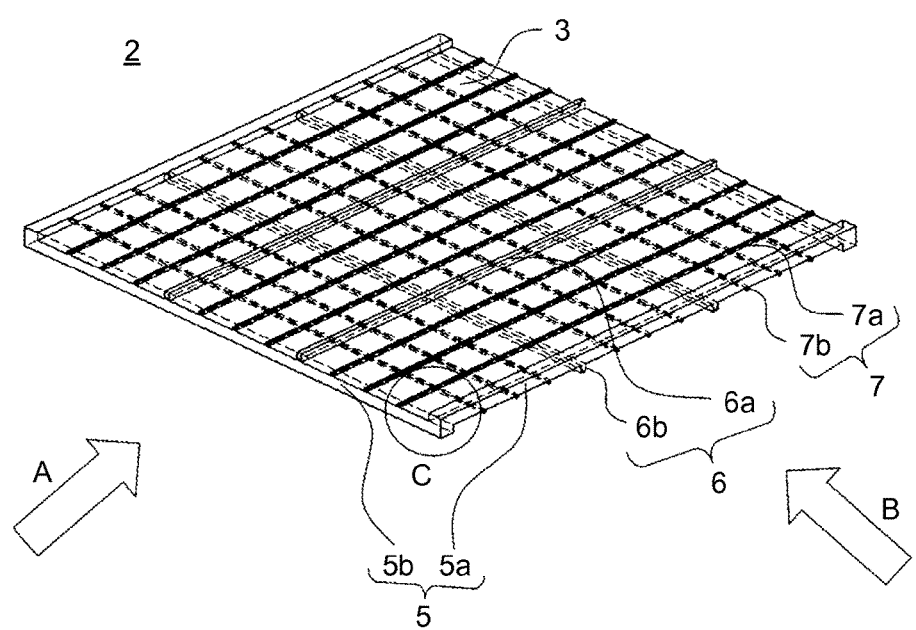
FIG. 2 is a perspective view of a unit constituent member according to the first embodiment of the present invention.

A first embodiment of the present invention is explained with reference to the accompanying drawings. FIG. 1 is a perspective view of a heat exchange element according to the first embodiment of the present invention. FIG. 2 is a perspective view of a unit constituent member according to the first embodiment of the present invention.

As shown in FIG. 1, a heat exchange element 1 is formed by alternately stacking unit constituent members 2 that are turned by 90 degrees. Each of the unit constituent members 2 is configured from a partition member 3 that performs heat exchange of the air passing along the upper side and underside of the partition member 3 and that has heat-transfer properties, moisture permeability, and sealing properties, a spacing member 4 that holds the partition member 3 with a predetermined spacing, and a deflection suppressing rib 7 that suppresses deflection of the partition member 3. In the heat exchange element 1, a primary air flow A that passes along the upper side of the partition member 3 and a secondary air flow B that passes along the underside of the partition member 3 exchange heat and moisture through the partition member 3.

Each constituent element of the heat exchange element 1 is explained below in detail.

The partition member 3 serves as a medium through which heat and moisture pass when heat and moisture exchange is performed between the primary air flow A and the secondary air flow B. When the primary air flow A and the secondary air flow B pass through the partition member 3, a heat (or water vapor) temperature difference (or a water-vapor partial-pressure difference) in a higher-temperature-side (or higher-humidity-side) air flow is utilized on both surfaces of the partition member 3 to move the heat and moisture from the higher-temperature side (the higher-humidity side) to the lower-temperature side (or the lower-humidity side) through the partition member 3, thereby exchanging the temperature (humidity). At the same time, the partition member 3 is required to prevent the primary air flow A and the secondary air flow B from being mixed with each other and to be able to suppress movement of carbon dioxide, odor, and other components between the primary air flow A and the secondary air flow B. In order to satisfy these requirements, the partition member 3 has a high density, and preferably has a density of 0.95 [g/cm$^3$] or higher, an air permeability resistance (JIS: P8628) of 200 seconds/100 cc or higher, and moisture permeability. Specifically, the raw material of the partition member 3 can be a Japanese paper, a fire-proof paper in which inorganic additives are mixed, or other papers, such as a specially-processed paper having undergone special processing or a paper made from a mixture of resin and pulp. The material of the partition member 3 can be a porous sheet (such as a nonwoven fabric or an expanded PTFE film) bonded with heat, an adhesive, or the like, to a moisture-permeable film having undergone chemical treatment to provide the functionality such as moisture permeability and flame retardancy or to a water-insoluble hydrophilic polymer thin film formed of resin that has moisture permeability, such as polyurethane-based resin that includes an oxyethylene group, polyester-based resin that includes an oxyethylene group, or resin that includes a sulfonic acid group, an amino group, a hydroxyl group, or a carboxyl group at the terminal or side chain. Also, in a case of a sensible heat exchanger, the material of the partition member 3 can be a resin sheet or resin film of polystyrene-based ABS, AS, or PS resin, or of polyolefin-based PP or PE resin, or other materials having only heat-transfer properties and gas-shielding properties.

In order to improve the heat-transfer properties, moisture permeability, and gas-sealing properties of the partition member 3, a manufacturing method is used in which cellulose fibers (pulp) are fibrillated by sufficient beating, and after making a paper by using the fibrillated fibers, calendering (pressing) is performed on the paper by a super calender or the like. The partition member 3 manufactured by this manufacturing method has a thickness of approximately 20 to 60 μm, and a density of 0.9 g/cm$^3$ or higher, or extremely close to 1 g/cm$^3$, or can have a density even higher in some cases. As compared with normal papers (a thickness of approximately 100 to 150 μm and a density of approximately 0.6 to 0.8 g/cm$^3$), the partition member 3 has a higher-density structure. In terms of the gas-sealing properties, conventionally, polyvinyl alcohol that serves as a filler is applied to a porous paper in order to increase the air permeability resistance. However, when the partition member 3 is highly densified as described above, its holes are filled with the cellulose fibers themselves at a high density, and therefore the air permeability resistance of approximately 5,000 seconds/100 cc is ensured without performing such special processing as described above.

When the partition member 3 that is highly densified as described above is used, the bonding of the partition member 3 to the spacing member 4 becomes a problem. In a case where molten resin is poured onto the partition member 3 described in the present embodiment to bond the partition member 3 to the spacing member 4, it is almost impossible for the resin to enter fine cavities and a sufficient anchor effect is not obtained, although this can also be related to the wettability of the partition member 3 with the resin, or other factors. Therefore, the partition member 3 and the resin are in a state where their respective surfaces are bonded together only by a chemical bond such as the Van der Waals force or a hydrogen bond. By pulling the partition member 3 and the resin off each other, they come off their interfaces. Accordingly, sufficient long-term reliability of the bonded portion is not obtained.

The spacing member 4 has a function of maintaining the height of an air-flow path constant when the unit constituent members 2 are stacked. Specifically, the spacing member 4 constitutes the outer frame of the heat exchange element 1, and is configured from sealing ribs 5 that are provided at both ends of the heat exchange element 1 parallel to an air-flow direction in order to prevent air leakage from the both ends, and a plurality of spacing ribs 6 that are provided parallel to the sealing ribs 5 and at a predetermined spacing and that maintain the spacing between the partition members 3 in a stacked direction when the unit constituent members 2 are stacked, to form an air-flow path.

As shown in FIG. 2, the sealing ribs 5 are formed along the peripheral edge of the unit constituent member 2, and are configured from first sealing ribs 5a that are provided on both sides of the upper surface of the partition member 3 and parallel to the direction of the primary air flow A, and second sealing ribs 5b that are provided on both sides of the undersurface of the partition member 3 and parallel to the direction of the secondary air flow B.

The spacing ribs 6 are configured from first spacing ribs 6a that are connected to the second sealing ribs 5b and provided between the first sealing ribs 5a and parallel to each other at a predetermined spacing, and second spacing ribs 6b that are connected to the first sealing ribs 5a and provided between the second sealing ribs 5b and parallel to each other at a predetermined spacing.

It is necessary to set the height of the sealing ribs 5 and the spacing ribs 6 so as not to block an air-flow path even when the partition member 3 expands after absorbing moisture.

Between the spacing ribs 6 adjacent to each other, a plurality of the deflection suppressing ribs 7 that suppress blockage of an air-flow path due to the deflection of the partition member 3 are provided at a predetermined spacing and parallel to the spacing ribs 6.

Specifically, the deflection suppressing ribs 7 are configured from first deflection-suppressing ribs 7a that are connected to the second sealing ribs 5b and provided between the first spacing ribs 6a and parallel to each other at a predetermined spacing, and second deflection-suppressing ribs 7b that are connected to the first sealing ribs 5a and provided between the second spacing ribs 6b and parallel to each other at a predetermined spacing.

The deflection suppressing rib 7 is formed with a smaller height and a smaller width than those of the spacing member 4. The sealing rib 5, the spacing rib 6, and the deflection suppressing rib 7 are formed on both the upper surface and the undersurface of the partition member 3 with those on the upper surface rotated by 90 degrees relative to those on the undersurface. It is desirable for the deflection suppressing rib 7 to have a thin, narrow shape so as to minimize the pressure loss of ventilating air and so as not to decrease the heat-transfer area and the moisture-permeable area of the partition member 3. Therefore, it is desirable for the deflection suppressing rib 7 to have a small rib height and a small rib width. Specifically, it is desirable that the rib height of the deflection suppressing rib 7 is smaller than half the rib height of the spacing rib 6 so as not to interfere with (contact) the deflection suppressing ribs 7 on the upper and lower layers when they are stacked. Further, because the width of the deflection suppressing rib 7 can be a cause of reducing the heat-transfer area and the moisture-permeable area, it is desirable to form the deflection suppressing rib 7 as thin as possible during molding.

This can be obtained by molding them with the partition member 3 inserted into a die on which each shape of the sealing rib 5, the spacing rib 6, and the deflection suppressing rib 7 is cut. In addition to this, concave and convex portions and holes for positioning during stacking, and a portion that receives a stripper for pushing a molded product out of the die can be appropriately provided, for example. These portions have a function of maintaining the spacing between the partition members 3 when a larger number of the partition members 3 are stacked.

The unit constituent member 2 has a substantially square shape (when the primary air flow A and the secondary air flow B cross each other at a right angle) or a parallelogram shape (when the primary air flow A and the secondary air flow B cross each other at an oblique angle). In order to prevent product defects due to insertion misalignment at the time of molding the partition member 3 as much as possible and in order to increase the reliability of preventing air leakage, generally, the width of the sealing rib 5 is set greater than the width of the spacing rib 6. Particularly, when the occupation area of the spacing ribs 6 on the partition member 3 is increased, this directly reduces the heat-transfer/moisture-permeable area of the partition member 3. Therefore, it is desirable that the width of the spacing rib 6 is as small as possible. With the small width, the amount of resin to be used can also be reduced. The resin used for the spacing member 4 can be polypropylene (PP) resin, acrylonitrile-butadiene-styrene (ABS) resin, polystyrene (PS) resin, acrylonitrile-styrene (AS) resin, polycarbonate (PC) resin, or other common resins capable of being molded into a desired shape. By molding the ribs with the resin as described above, deformation of the spacing member 4 due to humidity can be suppressed, and stable air-flow paths can be configured. Further, these resins can be made flame retardant by adding a flame retardant, or can achieve improvements in dimensional stability and strength by adding an inorganic substance. Depending on the object, it is also possible to achieve, for example, a reduction in the amount of resin by adding a foaming agent (a physical foaming agent/a chemical foaming agent) to foam the resin.

FIG. 3 is an enlarged view of part C in FIG. 2 according to the first embodiment of the present invention.

As shown in FIG. 3, the present invention has a structure in which the partition member 3 is sandwiched from both sides by the second deflection-suppressing rib 7b and detachment suppressing rib 8.

The detachment suppressing rib 8 has substantially the same shape as the second deflection-suppressing rib 7b that sandwiches the partition member 3 from the opposite side with respect to the partition member 3. One end of the detachment suppressing rib 8 is bonded to the first deflection-suppressing rib 7a and the other end thereof is bonded to the first sealing rib 5a.

However, if the detachment suppressing rib 8 is too large, it interferes with the air flow flowing along a flow path. Therefore, it is desirable that the detachment suppressing rib 8 is as thin as possible. However, if the detachment suppressing rib 8 is too thin, it cannot resist a force that causes the partition member 3 to be deformed. Accordingly, it is necessary for the detachment suppressing rib 8 to have a height greater than the thickness of the partition member 3, and also equal to or lower than 15% of the height of one air-flow path, and more desirably, equal to or lower than 10% of the height of one air-flow path. Further, in order not to interfere with an air flow that contacts the detachment suppressing rib 8, it is desirable that not only the height of the detachment suppressing rib 8 but also the shape thereof are set so as not to have a high resistance against the air flow.

The second deflection-suppressing rib 7b and the detachment suppressing rib 8 do not have a sufficient anchor effect between them and the partition member 3. However, the second deflection-suppressing rib 7b, the detachment suppressing rib 8, and the partition member 3 are bonded together by a chemical bond such as the Van der Waals force or a hydrogen bond.

FIG. 4 is a cross-sectional view of the detachment suppressing rib 8 according to the first embodiment of the present invention.

In the above explanations of FIG. 3, the square shape in cross section that is the pattern in FIG. 4(a) is used. However, taking the resistance of the air in an air-flow path into consideration, it is preferable to have an inverted-V shape, a trapezoidal shape, an elliptical shape, or the like, which causes less air turbulence, in cross section taken along the direction of an air flow that contacts the detachment suppressing rib 8, as shown in FIGS. 4(b) to 4(d).

By employing the above configuration, when the partition member 3 is sandwiched by the second deflection-suppressing rib 7b and the detachment suppressing rib 8, even if the partition member 3 expands and is deformed in high-humidity environment, the detachment suppressing rib 8 can push the partition member 3 against a force that is applied vertically to the bonded surface and that causes the partition member 3 to come off the bonded surface. Further, one end of the detachment suppressing rib 8 is bonded to the first deflection-suppressing rib 7a and the other end thereof is bonded to the first sealing rib 5a. This restricts the movement of the detachment suppressing rib 8; therefore, deformation of the partition member 3 can be suppressed.

Further, by sandwiching the partition member 3 between the second deflection-suppressing rib 7b and the detachment suppressing rib 8, the moisture absorbing area is made smaller, and therefore the amount of expansion/contraction of the partition member 3 on the bonded surface can also be made smaller. Accordingly, a force that is generated because of the deformation is also made smaller. Even when the area of the partition member 3 is reduced by sandwiching (covering) the partition member 3 by the detachment suppressing rib 8, the heat exchangeable area is not reduced because the second deflection-suppressing rib 7b is provided on the opposite side of the detachment suppressing rib 8. Therefore, sandwiching the partition member 3 between the detachment suppressing rib 8 and the second deflection-suppressing rib 7b does not degrade the heat exchange efficiency.

In FIG. 3 shown in the first embodiment, one end of the detachment suppressing rib 8 is bonded to the first deflection-suppressing rib 7a and the other end thereof is bonded to the first sealing rib 5a. However, both ends of the detachment suppressing rib 8 are not necessarily bonded to the first deflection-suppressing rib 7a and to the first sealing rib 5a. Even by simply sandwiching both surfaces of the partition member 3 by the detachment suppressing rib 8 and the second deflection-suppressing rib 7b, detachment of the partition member 3 can be suppressed by the weight of the detachment suppressing rib 8.

In the first embodiment, the structure is employed in which the partition member 3 is sandwiched by the second deflection-suppressing rib 7b and the detachment suppressing rib 8. However, the same effects can also be obtained from a structure in which the partition member 3 is sandwiched by the detachment suppressing rib 8 and the first deflection-suppressing rib 7a, the first sealing rib 5a, the second sealing rib 5b, the first spacing rib 6a, or the second spacing rib 6b.

The detachment suppressing rib 8 can be provided to all the first sealing rib 5a, the second sealing rib 5b, the first spacing rib 6a, the second spacing rib 6b, the first deflection-suppressing rib 7a, and the second deflection-suppressing rib 7b, or can be provided to some of them. By increasing the number of locations where the detachment suppressing rib 8 is provided, the effect of suppressing the detachment is increased.

The heat exchange element according to the first embodiment of the present invention has a structure in which a partition member is sandwiched by using resin. Therefore, even when a high-density high-performance partition member is used and a spacing member has a thin rib shape, it is possible to obtain the heat exchange element with a low air-flow resistance and high total heat exchange efficiency by suppressing detachment of the partition member and the spacing member from their bonded portion due to deflection of the partition member caused by a change in temperature and humidity.

Second Embodiment

Figure 5:
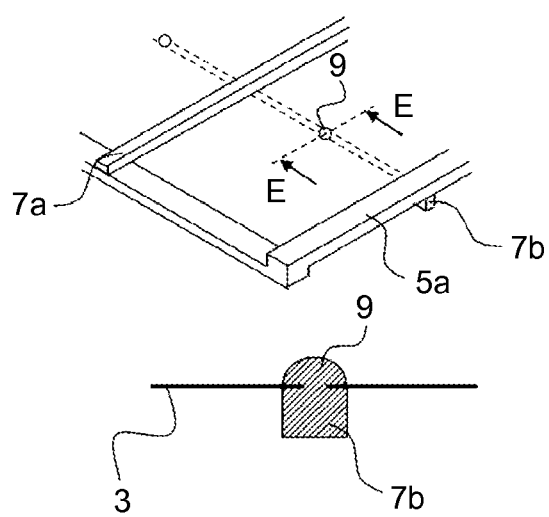
FIG. 5 is an enlarged view of part C in FIG. 2 according to a second embodiment of the present invention.

A second embodiment of the present invention is explained with reference to the accompanying drawings. FIG. 5 is an enlarged view of part C in FIG. 2 according to the second embodiment of the present invention. Because the second embodiment is the same as the first embodiment except for the structure of a detachment suppressing rib, the second embodiment is explained by focusing only on the structure of the detachment suppressing rib.

In the second embodiment, as shown in FIG. 5, the structure is employed in which the partition member 3 is sandwiched by the second deflection-suppressing rib 7b and a detachment suppressing rib 9 and is partially penetrated by these ribs (the second deflection-suppressing rib 7b and the detachment suppressing rib 9 are integrated with the partition member 3 sandwiched therebetween).

However, when the detachment suppressing rib 9 is too large, it interferes with the air flow flowing along a flow path. This point is the same as in the first embodiment. Therefore, it is desirable that the detachment suppressing rib 9 is as small as possible.

Figure 6:
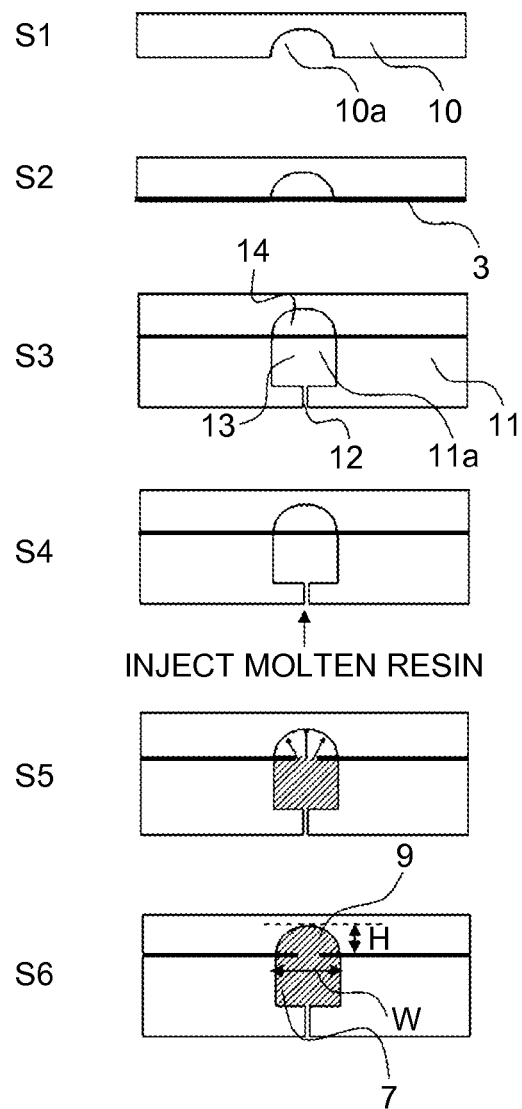
FIG. 6 is a cross-sectional view of a die used in a process of manufacturing a detachment suppressing rib according to the second embodiment of the present invention.

The process of manufacturing the detachment suppressing rib 9 provided according to the second embodiment is explained below. FIG. 6 is a cross-sectional view of a die used in the process of manufacturing the detachment suppressing rib 9 according to the second embodiment of the present invention.

As shown in FIG. 6, first, the partition member 3 is set on an upper die 10 that includes an upper-die concave portion 10a that is a concave portion having a shape of the detachment suppressing rib 9, so as to cover the upper-die concave portion 10a (S1 and S2). A lower die 11 that includes a lower-die concave portion 11a that is a concave portion having a shape of the deflection suppressing rib 7 is set (S3). The lower die 11 includes a resin injection port 12 through which molten resin can be injected. At this point, it is necessary to set the upper die 10 and the lower die 11 such that a space created by the upper-die concave portion 10a and the lower-die concave portion 11a is partitioned by the partition member 3. Among the partitioned spaces, the space defined by the partition member 3 and the lower-die concave portion 11a is designated as a space A 13 and the space defined by the partition member 3 and the upper-die concave portion 10a is designated as a space B 14. Next, molten resin obtained by melting thermoplastic resin is injected from the resin injection port 12 provided in the lower die 11 (S4). When the molten resin is injected, the space A 13 is gradually filled with the molten resin. At the time of injection molding, the pressure at which the molten resin is injected is so high that a force is applied toward the low-pressure space B 14, and the partition member 3 is broken through (S5). At this point, in the partition member 3 that partitions the space into the space A 13 and the space B 14, the center and its adjacent portion, where the highest pressure is applied, are broken through. Upon breaking through the partition member 3, the pressure within the space A 13 is released in the direction of the space B 14. Therefore, the molten resin is injected into the space B 14 and gradually fills the space B 14 (S6). Accordingly, the deflection suppressing rib 7 is molded by the space A 13 and the detachment suppressing rib 9 is molded by the space B 14. Thus, the partition member 3 has a structure in which it is sandwiched by the deflection suppressing rib 7 and the detachment suppressing rib 9 and is partially penetrated by these ribs. However, in order to break through the partition member 3 by molten resin, first, high-pressure molten resin pushes the partition member 3 and then the partition member 3 gradually expands and is eventually broken when it expands beyond its breaking elongation. If the height of the upper-die concave portion 10a is small, when the partition member 3 expands, it adheres to the wall surface of the upper-die concave portion 10a, and therefore the upper-die concave portion 10a is filled with molten resin while the partition member 3 remains unbroken. Accordingly, it is desirable to break the partition member 3 in order to more reliably bond the partition member 3 and the molten resin together. In order to achieve this, there is an important relationship between the height of the upper-die concave portion 10a, in other words, a height H of the detachment suppressing rib 9, and the width of the contact portion of the upper-die concave portion 10a and the partition member 3, in other words, a minimum width dimension W of the contact surface of the detachment suppressing rib 9 and the partition member 3. The ratio H/W is desirably large and is more preferably equal to or higher than 0.5 (H/W≥0.5).

FIG. 7 is a cross-sectional view of the detachment suppressing rib 9 according to the second embodiment of the present invention.

In the above explanations of FIG. 5, the elliptical shape in cross section that is the pattern in FIG. 7(a) is used. However, taking the resistance of the air in an air-flow path into consideration, it is preferable to have an inverted-V shape or the like, which causes less air turbulence, in cross section taken along the direction of an air flow that contacts the detachment suppressing rib 9, as shown in FIG. 7(b). Particularly, when the trapezoidal shape in cross section as shown in FIG. 7(C) is employed, an improvement in mold releasability from a die can be achieved in addition to the effect of reducing the resistance of air that flows along an air-flow path.

Further, a diagram as viewed from an H direction in FIG. 7(c) is shown in FIGS. 7(d) to 7(f). FIG. 7(d) shows a so-called conical shape, in which the portion in which the partition member 3 and the detachment suppressing rib 9 are in contact with each other has a circular shape and the top of the detachment suppressing rib 9 has a circular shape in cross section. FIG. 7(e) shows a so-called elliptical conical shape, in which the portion in which the partition member 3 the detachment suppressing rib 9 are in contact with each other has an elliptical shape and the top of the detachment suppressing rib 9 has also an elliptical shape in cross section. This elliptical conical shape extends longitudinally in the direction of an air flow. FIG. 7(*f*) shows a so-called combination of the conical shape and the elliptical conical shape, in which the portion in which the partition member 3 and the detachment suppressing rib 9 are in contact with each other has a circular shape and the top of the detachment suppressing rib 9 has an elliptical shape in cross section. This elliptical conical shape extends longitudinally in the direction of an air flow.

The detachment suppressing rib 9 is provided on the deflection suppressing rib 7, the spacing rib 6, and the sealing rib 5, and therefore cannot extend outside from these ribs. Accordingly, in a case where the portion in which the partition member 3 and the detachment suppressing rib 9 are in contact with each other has a circular shape, the area where the partition member 3 is sandwiched can be made larger than that in the case of an elliptical shape. Thus, in FIGS. 7(*d*) and 7(*f*), the area where the partition member is sandwiched becomes larger and thus the adhesive force becomes larger. In the case of FIGS. 7(*e*) and 7(*f*), in which the detachment suppressing rib 9 has a so-called elliptical conical shape or a so-called combination of the conical shape and the elliptical conical shape, which extends longitudinally (Lf>Lw) in the direction of an air flow flowing along an air-flow path, the air-flow resistance becomes lower than the case where the detachment suppressing rib 9 has a so-called conical shape. Therefore, in order to satisfy both an adhesive force of the partition member 3 and a reduction in the air-flow resistance, the combination of the conical shape and the elliptical conical shape shown in FIG. 7(*f*) is more preferable.

By employing the above configuration, when the partition member 3 is sandwiched by the second deflection-suppressing rib 7*b* and the detachment suppressing rib 9, even if the partition member 3 expands and is deformed in high-humidity environment, the detachment suppressing rib 9 can push the partition member 3 against a force that is applied vertically to the bonded surface and that causes the partition member 3 to come off the bonded surface.

In addition to the structure in which the partition member 3 is sandwiched by the second deflection-suppressing rib 7*b* and the detachment suppressing rib 9, the structure is employed in which the partition member 3 is partially penetrated by these ribs (the second deflection-suppressing rib 7*b* and the detachment suppressing rib 9 are integrated with the partition member 3 sandwiched therebetween). Therefore, as compared with the case of the first embodiment in which the partition member 3 is simply sandwiched by the second deflection-suppressing rib 7*b* and the detachment suppressing rib 8, a greater anchor effect can be obtained by using resin that enters the irregularities on the broken surface, thereby producing an effect that the partition member 3 can be bonded more rigidly. Further, because the volume of resin used for the detachment suppressing rib 9 is smaller than that in the first embodiment, the amount of resin to be used is reduced accordingly. The resin can be made flame retardant by adding a flame retardant, or can achieve improvements in dimensional stability and strength by adding an inorganic substance. Depending on the object, it is also possible to achieve, for example, a reduction in the amount of resin by adding a foaming agent (a physical foaming agent/a chemical foaming agent) to foam the resin. These points are the same as in the first embodiment.

In the second embodiment, the structure is employed in which the partition member 3 is sandwiched by the second deflection-suppressing rib 7*b* and the detachment suppressing rib 9 and is partially penetrated by these ribs (the second deflection-suppressing rib 7*b* and the detachment suppressing rib 9 are integrated with the partition member 3 sandwiched therebetween). However, the same effects can also be obtained from a structure in which the partition member 3 is sandwiched by the detachment suppressing rib 9 and the first deflection-suppressing rib 7*a*, the first sealing rib 5*a*, the second sealing rib 5*b*, the first spacing rib 6*a*, or the second spacing rib 6*b*, and is partially penetrated by these ribs.

The detachment suppressing rib 9 can be provided to all the first sealing rib 5*a*, the second sealing rib 5*b*, the first spacing rib 6*a*, the second spacing rib 6*b*, the first deflection-suppressing rib 7*a*, and the second deflection-suppressing rib 7*b*, or can be provided to some of them. By increasing the number of locations where the detachment suppressing rib 9 is provided, the effect of suppressing the detachment is increased.

If a large number of the detachment suppressing ribs 9 are provided for the purpose of suppressing detachment of the partition member 3, detachment of the partition member 3 can be suppressed. However, the occupation ratio of the detachment suppressing ribs 9 in an air-flow path becomes high and accordingly the air-flow resistance is increased. In contrast, if only a small number of the detachment suppressing ribs 9 are provided, the occupation ratio of the detachment suppressing ribs 9 in an air-flow path can become low. However, there is a possibility that deflection of the partition member 3 is increased, which may lead to an increase in air-flow resistance. As a result, the air-flow resistance is increased. Therefore, in order to suppress the air-flow resistance to a low level, it is necessary to examine the arrangement spacing between the detachment suppressing ribs 9.

FIG. 8 is an explanatory diagram of the arrangement spacing between the detachment suppressing ribs in a heat exchange element according to the second embodiment of the present invention. FIG. 8 is a cross-sectional view of the second deflection-suppressing rib 7*b* and the detachment suppressing rib 9 as viewed from an E direction in FIG. 5.

FIG. 8(*a*) is a diagram in which the unit constituent members 2 are stacked, each of which includes three detachment suppressing ribs 9 on the second deflection-suppressing rib 7*b* that connects the first sealing rib 5*a* and its immediately-adjacent first deflection-suppressing rib 7*a*. This description focuses on the detachment suppressing ribs on the second deflection-suppressing rib 7*b* that connects the first sealing rib 5*a* and the first deflection-suppressing rib 7*a*; however, it is not limited thereto.

The height of an air-flow path is represented as g [mm], the arrangement spacing between the detachment suppressing ribs 9 is represented as p [mm], and the rate of change in dimension of the partition member 3 at the time of its expansion is represented as σ. The rate of change in dimension σ is determined by dividing the length of the expanded portion of the partition member 3 by the reference length of the partition member before the expansion. The dimensions of the expanded portion of the partition member are defined as the dimensions of the expanded portion of the partition member 3, which has completely expanded after having been left in environmental conditions where the relative humidity is extremely close to 100% RH for a sufficient period of time.

With reference to FIG. 8(*b*), a condition in which the partition members 3 completely block the space between its immediately-adjacent detachment suppressing ribs 9 is explained below.

The temperature and humidity of air that flows between the immediately-adjacent detachment suppressing ribs 9 can be considered to be substantially uniform. Therefore, the partition members 3 that respectively constitute the upper surface and the lower surface between the immediately-adjacent detachment suppressing ribs 9 can be considered to expand by the same amount at their opposed position. Accordingly, if each of the partition members 3 that respectively constitute the upper surface and the lower surface blocks half the air-flow path, the entire space between the immediately-adjacent detachment suppressing ribs 9 is completely blocked. A condition in which the partition member 3 on the upper surface or the lower surface blocks half the air-flow path in this manner is described below.

The length of the partition member 3 on the upper surface or the lower surface between the immediately-adjacent detachment suppressing ribs 9 after the partition member 3 has sufficiently expanded is represented as p(1+σ). The required length for the partition member 3 to block half the air-flow path is represented as p+2(g/2). Therefore, the following relationship holds.

$$p(1+\sigma) = p + 2(g/2) \quad \text{(Equation 1)}$$

That is, when the following relationship is satisfied, the partition members 3 completely block the air-flow path.

$$p = g/\sigma \quad \text{(Equation 2)}$$

Therefore, in order for the partition members 2 not to completely block the air-flow path, it is necessary to satisfy the following relationship.

$$p < g/\sigma \quad \text{(Equation 3)}$$

By arranging the detachment suppressing ribs 9 so as to satisfy the above requirement (Equation 3), the situation where the partition members 3 completely block the air-flow path can be prevented.

Even if the partition members 3 that respectively constitute the upper and lower surfaces between the immediately-adjacent detachment suppressing ribs 9 do not completely block the air-flow path, if the partition members 3 join each other, there are problems in that the surface coating comes off, and upon the environmental changes, the partition members 3 return to their original length at a slower speed. Therefore, it is preferable to arrange the detachment suppressing ribs 9 in such a manner that the partition members 3 that respectively constitute the upper and lower surfaces between the immediately-adjacent detachment suppressing ribs 9 do not join each other.

With reference to FIG. 8(c), a condition in which the partition members 3 start contacting each other is explained below.

The partition member 3 is deflected to the greatest extent at the halfway point between the detachment suppressing ribs 9, which is the maximum-distance position from the detachment suppressing ribs 9. Therefore, when this halfway point reaches the halfway point of the height g [mm] of an air-flow path, there is a possibility of the partition members 3 to start contacting each other. The length of the partition members 3 on the upper surface or the lower surface of one air-flow path after the partition member has sufficiently expanded is represented as p(1+σ). Therefore, the following relationship holds.

$$g/2 = \sqrt{\left(\frac{(1+\sigma)p}{2}\right)^2 - \left(\frac{p}{2}\right)^2} \quad \text{(Equation 4)}$$

That is, when the following relationship is satisfied, the partition members 3 that respectively constitute the upper and lower surfaces of an air-flow path start joining each other.

$$p = \frac{g}{\sqrt{\sigma(\sigma+2)}} \quad \text{(Equation 5)}$$

Therefore, in order for the partition members 3 not to join each other, it is necessary to satisfy the following relationship.

$$p < \frac{g}{\sqrt{\sigma(\sigma+2)}} \quad \text{(Equation 6)}$$

As shown in (Equation 3) and (Equation 6), the arrangement spacing between the detachment suppressing ribs 9 is proportional to the height g of an air-flow path and is inversely proportional to the rate of change in dimension σ. Therefore, in a case where the height of the air-flow path is large, the arrangement spacing can be increased. In a case of using a partition member with a high rate of change in dimension, it is necessary to reduce the arrangement spacing.

Further, in a case of providing the detachment suppressing ribs 9, it is desirable that the positions of the detachment suppressing ribs 9 are aligned in the air-flow direction as much as possible within one air-flow path as shown in FIG. 9 because this can further reduce the air-flow resistance. For example, as shown in FIG. 9(a), in a case of a straight flow path, it is desirable that the detachment suppressing ribs 9 are aligned in a straight line parallel to the side walls of an air-flow path. Further, as shown in FIG. 9(b), in a case of a curved flow path, it is desirable to arrange the detachment suppressing ribs 9 such that they are aligned along a line substantially parallel to the wall surfaces of an air-flow path. Therefore, in another case where an air-flow path is widened/narrowed in stages, it is desirable to provide the detachment suppressing ribs 9 along a flow line of fluid.

REFERENCE SIGNS LIST 1 heat exchange element
2 unit constituent member
3 partition member
4 spacing member
5 sealing rib
5a first sealing rib
5b second sealing rib
6 spacing rib
6a first spacing rib
6b second spacing rib
7 deflection suppressing rib
7a first deflection-suppressing rib
7b second deflection-suppressing rib
8 detachment suppressing rib
9 detachment suppressing rib
10 upper die
10a upper-die concave portion
11 lower die
11a lower-die concave portion
12 resin injection port
13 space A
14 space B A primary air flow
B secondary air flow
The invention claimed is:
1. A heat exchange element comprising:
a plurality of unit constituent members, each of which includes:
a partition member that has a heat-transfer property and a moisture permeability,
a spacing member that holds the partition member with a predetermined spacing, and
a deflection suppressing rib that suppresses deflection of the partition member,
wherein the unit constituent members are stacked, and wherein a primary air flow passes along an upper surface side of the partition member, and a secondary air flow passes along an undersurface side of the partition member in a direction transverse to the direction of the primary air flow, to exchange heat and moisture through the partition member, further wherein each spacing member includes:
first sealing ribs that are provided on opposite sides of an upper surface of the partition member and parallel to a direction of the primary air flow,
second sealing ribs that are provided on opposite sides of an undersurface of the partition member and parallel to a direction of the secondary air flow,
first spacing ribs that are connected to the second sealing ribs and are provided between the first sealing ribs and parallel to each other at a predetermined spacing, and
second spacing ribs that are connected to the first sealing ribs and are provided between the second sealing ribs and parallel to each other at a predetermined spacing, and
each deflection suppressing rib includes:
first deflection-suppressing ribs that are connected to the second sealing ribs and are provided between the first spacing ribs and parallel to each other at a predetermined spacing, and
second deflection-suppressing ribs that are connected to the first sealing ribs and are provided between the second spacing ribs and parallel to each other at a predetermined spacing, and
each constituent member comprises a detachment suppressing rib that sandwiches the partition member between the detachment suppressing rib and at least one of the first deflection-suppressing rib and the second deflection-suppressing rib.

2. The heat exchange element according to claim 1, wherein the detachment suppressing rib is provided to both of the first deflection-suppressing rib and the second deflection-suppressing rib of the deflection suppressing rib.

3. The heat exchange element according to claim 1, wherein at least one detachment suppressing rib and at least one first deflection-suppressing rib or second deflection-suppressing rib are integrally connected by penetrating part of the partition member.

4. The heat exchange element according to claim 3, wherein a relationship of H/W≥0.5 is satisfied, where W is a minimum width dimension of the detachment suppressing rib at the surface of the partition member, and H is a height of the detachment suppressing rib from the partition member.

5. The heat exchange element according to claim 3, wherein
a portion in which the detachment suppressing rib and the partition member are in contact with each other has a substantially circular shape in cross section, and
a top of the detachment suppressing rib has a substantially circular shape in cross section.

6. The heat exchange element according to claim 3, wherein
a portion in which the detachment suppressing rib and the partition member are in contact with each other has a substantially elliptical shape in cross section,
a top of the detachment suppressing rib has a substantially elliptical shape in cross section, and
these substantially elliptical shapes extend longitudinally along an air flow direction.

7. The heat exchange element according to claim 3, wherein
a portion in which the detachment suppressing rib and the partition member are in contact with each other has a substantially circular shape in cross section,
a top of the detachment suppressing rib has a substantially elliptical shape in cross section, and
the substantially elliptical shape of the top extends longitudinally along an air flow direction.

8. The heat exchange element according to claim 3, wherein a relationship of p<g/σ is satisfied, where g is a height of an air-flow path formed between two stacked unit constituent members, σ is a rate of change in dimension of a partition member, determined by dividing a length of an expanded portion of the partition member when the partition member has expanded due to environmental conditions by a reference dimension before the partition member expands, and p is a spacing between the detachment suppressing ribs.

9. The heat exchange element according to claim 3, wherein the following relationship is satisfied:

$$p < \frac{g}{\sqrt{\sigma(\sigma+2)}}$$

where g is a height of an air-flow path formed by stacking the unit constituent members, σ is a rate of change in dimension determined by dividing a length of an expanded portion of the partition member when the partition member has expanded by a reference dimension before the partition member expands, and p is an arrangement spacing between the detachment suppressing ribs.

10. The heat exchange element according to claim 3, wherein the detachment suppressing rib is arranged in the direction of an air-flow path.

* * * * *